United States Patent
Le Henaff et al.

(10) Patent No.: US 10,769,247 B2
(45) Date of Patent: Sep. 8, 2020

(54) SYSTEM AND METHOD FOR INTERACTING WITH INFORMATION POSTED IN THE MEDIA

(71) Applicants: Guy Le Henaff, Montreal (CA); Yves De Lavilleguerin, Lisbon (PT); Christophe Bossut, Vernon (FR)

(72) Inventors: Guy Le Henaff, Montreal (CA); Yves De Lavilleguerin, Lisbon (PT); Christophe Bossut, Vernon (FR)

( * ) Notice: Subject to any disclaimer, the term of this patent is extended or adjusted under 35 U.S.C. 154(b) by 51 days.

(21) Appl. No.: 15/529,361

(22) PCT Filed: Dec. 4, 2015

(86) PCT No.: PCT/CA2015/051268
§ 371 (c)(1),
(2) Date: May 24, 2017

(87) PCT Pub. No.: WO2016/086309
PCT Pub. Date: Jun. 9, 2016

(65) Prior Publication Data
US 2018/0336320 A1    Nov. 22, 2018

Related U.S. Application Data

(60) Provisional application No. 62/087,598, filed on Dec. 4, 2014.

(51) Int. Cl.
*G06F 7/04* (2006.01)
*G06F 21/10* (2013.01)
(Continued)

(52) U.S. Cl.
CPC .......... *G06F 21/10* (2013.01); *G06K 9/4671* (2013.01); *G06K 9/6202* (2013.01); *H04L 51/10* (2013.01);
(Continued)

(58) Field of Classification Search
CPC ......... G06F 2221/0733; G06F 2201/84; G06F 21/64; G06F 21/31
(Continued)

(56) References Cited

U.S. PATENT DOCUMENTS 6,002,525 A * 12/1999 Poulo ................. G01M 11/0221
359/642
6,076,111 A *  6/2000 Chiu .............. H04N 21/234363
709/203

(Continued)

OTHER PUBLICATIONS

Ye et al, Tracking a Person with Pre-recorded Image Database and a Pan, Tilt, and Zoom Camera, Aug. 26, 1999, pp. 32-43.*

(Continued)

*Primary Examiner* — Alexander Lagor
*Assistant Examiner* — Jenise E Jackson
(74) *Attorney, Agent, or Firm* — Hamre, Schumann, Mueller & Larson, P.C.

(57) ABSTRACT

Method and system for allowing a famous entity to reach out to their audience/fans/the public with comments, explanations and corrections in response to stories/allegations published about them in the media without infringing copyrights of the media owners. Using their portable device, users/fans may take a picture/snapshot or even activate their camera feed over a published page (e.g. magazine/poster/banner, web page) which is by default a copyrighted material. The imaging device transforms a picture of the page into a digest representing a non-copyrighted format of the copyrighted page and sends the digest to a remote server. The server performs a search and comparison between the received digest and pre-stored digests for which a reply was provided by the famous entity (VIP). If a match exists, the server fetches the reply and sends it back to the portable device for rendering on the display device of the portable device. The (Continued)

reply may include one or more of: text, drawings, handwritten notes, video, music etc.

12 Claims, 6 Drawing Sheets

(51) Int. Cl.
  *H04L 12/58* (2006.01)
  *G06K 9/46* (2006.01)
  *G06K 9/62* (2006.01)
  *G06T 5/00* (2006.01)

(52) U.S. Cl.
  CPC ...... *H04L 51/32* (2013.01); *G06F 2221/0724* (2013.01); *G06K 9/4676* (2013.01); *G06K 9/6215* (2013.01); *G06T 5/001* (2013.01)

(58) Field of Classification Search
  USPC .......................................................... 726/26
  See application file for complete search history.

(56) References Cited

U.S. PATENT DOCUMENTS

| | | | |
|---|---|---|---|
| 7,369,183 B2 | 5/2008 | Oka et al. | |
| 8,072,509 B2* | 12/2011 | Ruotsalainen | H04N 1/32 348/231.2 |
| 8,208,757 B2* | 6/2012 | Sakurai | G06K 9/4633 382/281 |
| 2006/0257028 A1* | 11/2006 | Laurent | G06F 17/30247 382/191 |
| 2008/0209010 A1* | 8/2008 | Zitnick, III | G06F 17/30244 709/219 |
| 2010/0111441 A1* | 5/2010 | Xiong | G06T 5/00 382/275 |
| 2011/0102605 A1* | 5/2011 | Hannaford | G06K 9/00671 348/207.1 |
| 2012/0074191 A1* | 3/2012 | Fisher | A45C 13/30 224/627 |
| 2013/0074191 A1* | 3/2013 | Ben-Reuven | G06F 21/6209 726/26 |
| 2013/0108187 A1 | 5/2013 | Tsai et al. | |
| 2013/0314568 A1* | 11/2013 | Vranceanu | H04N 5/2355 348/239 |
| 2014/0310264 A1* | 10/2014 | D'Ambrosio | G06F 16/58 707/722 |
| 2016/0014297 A1* | 1/2016 | Aller | H04M 1/72522 382/103 |
| 2019/0147246 A1* | 5/2019 | Bossut | H04L 51/32 |

OTHER PUBLICATIONS

Mavlankar et al, Optimal Slice Size for Streaming Regions of High Resolution Video with Virtual Pan/Tilt/Zoom Functionality, Sep. 7, 2007, pp. 1275-1279.*

European Search Report issued in European Application No. 15865062.2 dated May 24, 2018 (10 pages).

International Search Report issued in International Application No. PCT/CA2015/051268 dated Feb. 11, 2016 (4 pages).

Written Opinion issued in International Application No. PCT/CA2015/051268 dated Feb. 11, 2016 (6 pages).

* cited by examiner

SYSTEM AND METHOD FOR INTERACTING WITH INFORMATION POSTED IN THE MEDIA

RELATED APPLICATIONS

This application claims priority of U.S. provisional patent application 62/087,598 filed on Dec. 4, 2014, the specification of which is hereby incorporated by reference in its entirety.

BACKGROUND

(a) Field

The subject matter disclosed generally relates to a method and system which allows for commenting on, correcting and/or interacting with information posted in the media.

(b) Related Prior Art

Very frequently, the media in its diverse aspects (e.g. social networks, press, news, magazines, websites, books, articles, any sort of printed matter, etc.) publishes fabricated, erroneous or inaccurate stories/information about famous entities.

Such stories/information negatively impact the reputation of the famous entities that are mentioned therein. Examples of such stories include: divorce, lawsuits, matrimonial infidelity, fabricated gossips, legal problems, financial problems and so on.

Silence of the famous entities is often viewed as a confirmation of what has been published.

On the other hand, should the famous entities decide to address these allegations in a direct and straightforward manner, they may end up infringing the copyright associated with the owners of the media that is publishing the stories, thus, opening the door for more negative stories and financial losses.

For example, if a given magazine mentions on the cover thereof that a certain actor is facing legal problems based on harassment, and the given actor takes the cover page of the magazine to write a comment on it or about it and publishes such cover on a social media page or on their own website, the actor may infringe the copyright of the magazine owners for storing copyrighted materials without the permission of the copyright owners. Even if the story is wrong and/or offending, the famous entity is not allowed to re-use media material as they can be under constraint of usage driven by copyright laws. Normally these matters can only be solved through lawsuits which tend to be numerous, long and expensive.

Therefore, there is a need in the market for a system and method which allow a famous entity to react to such stories and reach out to the public without infringing the copyrights of the media owners and without engaging in lawsuits.

SUMMARY

The present embodiments describe such method.

According to an aspect, there is provided a computer-implemented method for interacting with information posted in media, the method comprising: receiving, from a first computing device, a first digest for a first picture and comments for associating with the first digest; wherein a given digest represents a non-copyrighted, format of a given picture representing copyrighted information published in the media; extracting from the first digest, a first set of salient points representing a first signature identifying the first picture; receiving, from the second computing device, a second digest for a second picture; extracting from the second digest, a second set of salient points representing a second signature identifying the second picture; if a similarity factor between the first signature and the second signature is beyond a pre-defined threshold, forwarding the comments associated with the first digest to the second computing device for viewing the comments over the second picture.

In accordance with another aspect there is provided a memory device having recorded thereon a non-transitory computer-readable program for execution by a processor of a computing device for causing the computing device to; take a picture of a copyrighted-material; transform the picture into a digest representing a non-copyrighted format of the picture; send the digest to a remote server for verification; in response to sending the digest, receive a set of comments from the remote server; and display the set of comments over the picture.

In a further aspect there is provided a computing device comprising: a processor; a memory; an imaging device; wherein the computing device is adapted to: take an image of a copyrighted material; transform the image into a non-copyrighted format; send the non-copyrighted format to a remote server for identification; receive from the remote server a set of comments provided by a third party on the copyrighted material; and display the set of comments over the picture of the copyrighted material.

The following terms are defined below.

The term famous entities is intended to mean include corporations, VIPs (Very Important Persons), public figures, politicians, actors, singers, leaders, famous people, rich people, inventors, owners or directors of corporations, writers etc.

The term picture can be intended to mean a single image of a document or one or more frames of a video feed. In the present embodiments, multiples frames may be taken from a video feed and using a tracking mechanism, it is possible to know the locations of every frame with respect to the other to construct a frame of a higher quality.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1A:
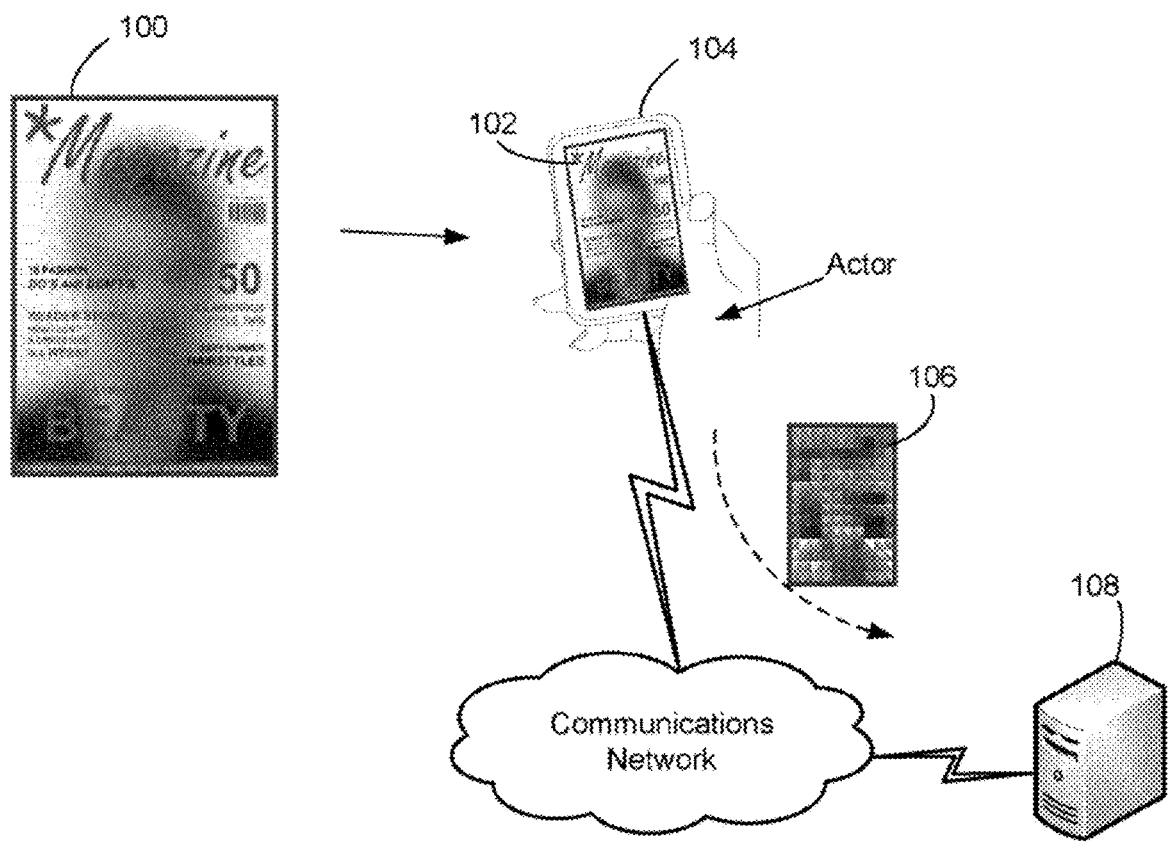
FIG. 1a and FIG. 1b illustrate the registration phase of a process, in which the actor detects offending materials and provides comments thereof for later viewing by the fans, in accordance with an embodiment.

The embodiments describe a system and method which allow a famous entity to reach out to their audience/fans and/or the public with comments, explanations and corrections in response to stories published about them in the media, and without infringing copyrights of the media owners. Using their portable device, users/fans may take a picture/snapshot or even activate their camera feed over a published page (e.g. magazine/poster/banner, web page) which is by default a copyrighted material. The imaging device transforms a picture of the page into a digest representing a non-copyrighted format of the copyrighted page and sends the digest to a remote server. The server performs a search and comparison between the received digest and pre-stored digests for which a reply was provided by the famous entity (VIP). If a match exists, the server fetches the reply and sends it back to the portable device for rendering on the display device of the portable device. The reply may include one or more of: text, drawings, handwritten notes, video, music etc. A similar embodiment may be used by the famous entity to send their reply on the published content to the server, without infringing the copyright associated with the media owners.

The famous entity when viewing offending materials published in the media, may, using a dedicated application or program, take a picture of the offending materials using a computing device and may provide comments on the offending materials. The comments overlay the picture and use the picture as a background on the screen of the computing device. The computing device of the famous entity would process the picture of the offending material (which is also subject to copyright) and will transform the picture into a first non-copyrighted binary format. Depending on the copyright laws of the country, this format may take the form of a digest, a degraded version of the picture or even a signature that identifies the picture, or any format that enables identification of the image in the database without requiring a re-construction of the image that would infringe copyright laws. The first non-copyrighted format and the comments are sent by the computing device to a remote server for storage and comparison. The fan when viewing such offending materials may take a picture thereof using a dedicated program or app which will transform the picture into a non-copyrighted format using the same rules as those used by the computing device of the famous entity. The app of the fan would send the second non-copyrighted format to the server for comparison. If the server detects a match between the first and the second non-copyrighted formats, the serve would send back the comments associated with the first format to the fan for viewing on the fan's computing device.

For simplicity, the following embodiments will be described with reference to the following:

an actor as a non-limiting example of a famous entity,
a fan as an non-limiting example of an audience, social network connection, social network follower, or any member of the public;
a comment as a non-limiting example of a reply, response, explanation, or any type of interaction that is done by the actor in response to stories published in the media.

FIGS. 1a to 1d illustrate a non-limiting example of a system and method for interacting with information posted in the media.

Figure 1B:
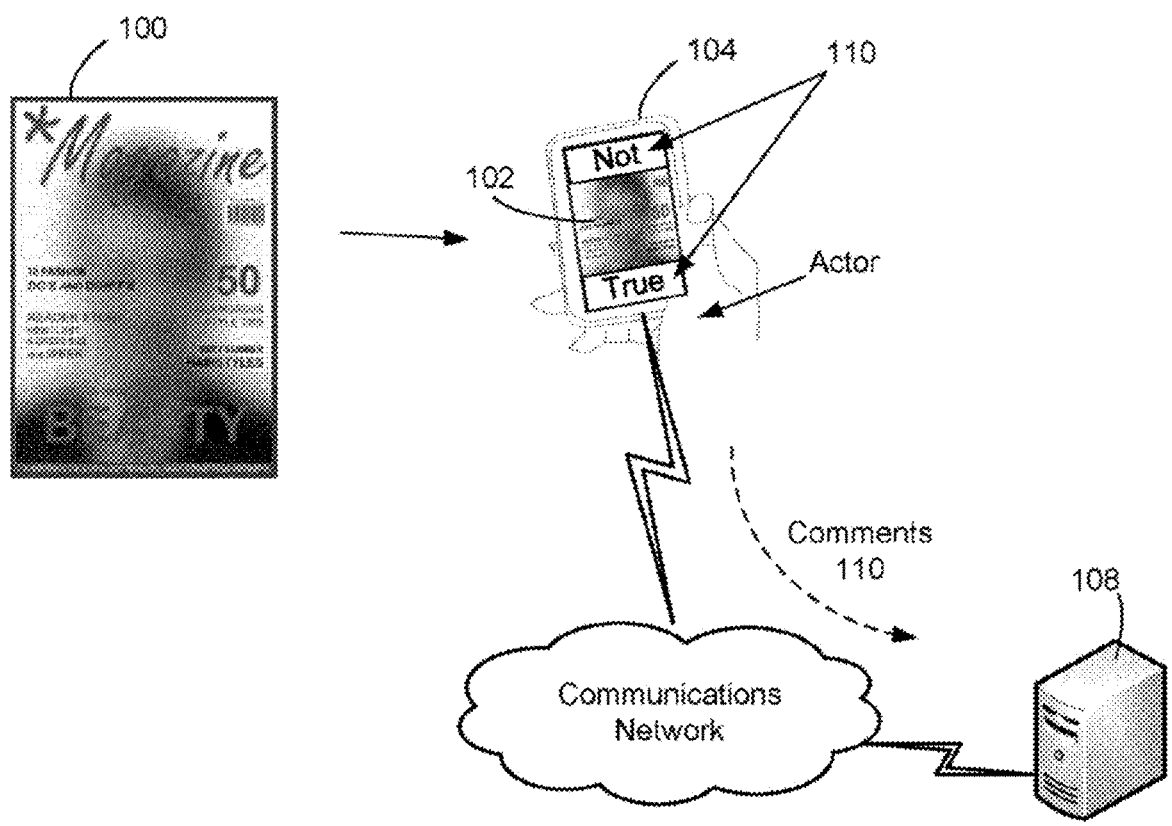

FIG. 1a and FIG. 1b illustrate the registration phase of the process. With reference to FIG. 1a, there is shown a magazine cover 100 showing the picture of an actor along with a headline representing wrong allegations about the actor. Upon viewing the cover 100, the actor may take picture 102 of the cover 100 with a portable device 104 using a designated application (the portable device and the designated app herein called the app), which will be described in further detail hereinbelow.

The ultimate goal of the application is to notify the server 108 of the existence of the wrong allegations without sending copyrighted materials to the server 108 for storage or processing. Due to the fact that copyright laws are different between a country and another, what is sent between the app and the server 108 may differ between one country and the other, in accordance with the copyright laws of each country. In some countries where the copyright laws are less strict, transmission and/or storage of a digest of the picture is not considered as a copyright infringement. Other countries consider that the digest is still protected under copyrights as long as the digest resembles the original document and/or includes legible text, drawings or symbols that are provided on the original document. In any case, the app is configured to transform the picture from the camera feed with and without storing it into a format that does not infringe the copyright but allows for identification and comparison.

In one embodiment, the app is configured to extract a digest 106 from the picture 102. Thus avoiding sending and storing copyrighted materials on the server 108, and avoiding copyright infringement on both the portable device 104 and the server 108.

It should be noted that in some cases (where copyright laws even prohibit taking a picture of the copyrighted material by the fan) it is possible to extract the digest (or the salient points) of the offending media without taking/storing a still picture even momentarily. In the present case, as the fan or actor is running the camera over the offending material in real time the digest may be extracted from the video feed of the camera without having to store a still image of the offending material. In an embodiment, a button may be used to allow the app the extract a digest from the video feed, thus avoiding to even store a picture of the offending material on the portable device of the fan/actor. For example when the fan/actor's hand is stable over the offending material they may press the button to extract the digest or salient points. The comments received by the server 108 (if any) may be displayed on the screen/display of the portable device as long as the offending material is still being photographed.

The app may be configured to include a real time tracking system that allows the display of the comments to follow the movements of the video camera of the fan. In an embodiment, a first position must be supplied by the server to determine the very first anchor point where the tracking system can hook the pattern matcher used by the real-time tacking system.

The app may then send the digest 106 to the server 108 for extracting and storing, salient points from the digest 106. Such salient points together define a signature that identifies the picture 102 and serves for recognition later on after the actor provides their comments on the picture 102

In the latter case a minimal of preprocessing is done by the app to extract the digest 106 and decrease the bandwidth requirement. Such preprocessing includes (but is not limited to): color conversion, gradient conversion with luminance neutralization, an edge like detection allowing to send a degraded version of the gradient image. Such degraded version represents the digest 106 and is sufficient to avoid copyright infringement in some countries. In an embodiment, the edge detection may generate some sort of binary mask that can be compressed using a compression system which keep the entropy, the benefit being again a better image data compression ratio.

In another embodiment, further processing is required by the app to extract the salient points at the portable device 104 and then send them to the server 108 as a set of binary data that. This scenario is required in countries where copyright laws are stricter. Extraction of the salient points is described in further detail hereinbelow.

Image Taken with Camera

The following embodiments describe various types of processing and image correction that are done by the server on the digest 106 of the picture 102 and/or the salient points extracted from digest 106. However, it is also contemplated that some of these steps may be done by the app. For example, as discussed above, the app may be configured to perform image correction and extraction of the salient points (representing the signature that serves as an identification of the page). For example, in countries where the digest 106 is considered as copyrighted material, it may happen that the app has to extract the salient points and send them to the server for comparison as the server is in a better situation to evaluate the pertinence of the salient points received from the app to consider/review them in view of other sets of salient points available from other pictures. The server determine from the digest and ideal set of salient point as the server may have access to an all set of salient points for training purposes to pre-train and educate the server, so that the server can determine the pertinence of the salient points received from the app for storage and comparison.

In cases where the image or even the digest 106 is not to be send to the server (for copyright reasons), the entire processing may occur in the app. Such processing does not require access to a reference database to be executed in a standalone version, and can be implemented in the app with the penalty of strong CPU usage.

However, when the process occurs at the app, the app may be configured to send the server additional information to allow the server to extract and determine the set of salient points to optimize the search not out of the digest analysis but from salient point set correlation with previous set and training set in the server.

In the case where the picture 102 is taken using the camera associated with a computing device (tablet, laptop, smartphone etc.), the server 108 may implement an image processing and sorting system that will first assert the quality of the digest 106 submitted. Depending on the quality of the picture, it is possible to use the picture as is or to perform additional processing/repairing before rasterizing the picture and extracting the signature of it.

In cases where it is not possible to use the picture or repair it, the server may guide the actor via the app to take a higher quality picture (higher in the sense that it allow a better extraction of salience aspect of the image). The server may, depending on the quality of the picture, communicate back to the app providing instructions and guidance as to how to take a better quality picture. In a non-limiting example, the server may indicate that there is too much luminosity and will suggest taking another picture in a place where there is less direct light on the magazine 100. In another example, the server may suggest taking the picture without moving the hand to avoid distortion and blurriness etc.

Examples of processing and repair include:

1. Barrel Distortion

When the image pickup is done on a page of a magazine or book other than the cover page, it is logical to assume that the magazine was open, and that the photographed page of the magazine was not flat enough during image pickup. In other words, the page being photographed includes a curvature on the surface due to the gutter. This type of distorting can be assimilated as a barrel distortion and may include perspective distortion.

In this case an analysis of the content may be done to allow for more explicit determination of the barrel distortion. In an embodiment, a Hough transform may be used for dealing with lines for determining the degree of distortion and even determine loci for correction. It can be understood that the Hough space will exhibit an accumulation of points on the zone made by the start of the barrel distortion close to the gutter. The statistical dispersion of accumulation node reveals a modified sinusoidal aspect characteristic of an open book.

Once the degree of distortion is determined, an image warping method may be used for correcting the distortion.

In an embodiment, correction of the barrel distortion is performed before performing the frequencies dispersion analysis.

2. Over Exposed Distortion

This type of distortion is related to use of flash or bright light while taking the picture of the page at a short distance especially when the page is printed on a glossy support like a glossy paper. In this case, areas of the page that are closest to the camera are considered as being "over exposed". In an embodiment, the server 108 may perform a frequency conversion in the frequency space (domain) followed by an analysis of mean frequency taken out of the frequency histogram.

Such overexposed area can also be diagnosed by the aspect of the edge that shows same frequencies but with a lower saturation for the HSV value of an area of a small size. Accordingly, an elliptical like gradient of saturation that simultaneously exhibits constancy in frequency distribution at least on some inner regular path of the ellipsoid can be used as a clue that such over exposed area exists. In an embodiment, the server may use the HSV histogram to obtain an estimate of the damage to apply the appropriate correction accordingly. Otherwise, if it fails to find enough information in the depth of the center part of the ellipsoid of overexposure the apparatus can ask the user to take another picture, warning user of the need to handle glossy specular effect and spurious lighting.

It must be noted that the corrections needed are not aimed at delivering a picture having a decent display for viewing by the user but only to provide the image processing with sufficient normalized geometrical aspect as well as color aspect that would allow decent gradient and frequencies preprocessing.

Otherwise, the server may return a notification to the app asking for a new picture.

Picture Already in Digital Format

In the case where the offending image and/or text (combined will be referred to as picture of the page) are just posted on a website or in a social media page or campaign, then a picture thereof may be direct taken in digital format e.g. on Window's® systems a picture of the screen may be taken by pressing ALT & PRINTSCREEN simultaneously, and on iPhones® pictures of the screen may be taken by pressing the shut down and menu buttons simultaneously etc.

Whether the picture is a snapshot of a magazine or taken immediately in a digital format from a website or social media app e.g. Facebook® app, the app may first rasterise the picture 102 of the offending page in full or in part for further processing. Once the image is acquired and rasterized, the app may perform a frequency analysis on the image using for example a histogram of frequencies. The main aim of such step is the detection of high frequencies, the absence of which is a sign of some strange focus. The picture 102 when processed by the app will be transformed into a signature or reference and will be sent to the server 108 to be stored, thus avoiding storage of copyrighted materials on the server 108.

Generation of Signature

Generation of such signature from the picture 102 is explained hereinbelow.

The embodiments transform the picture 102 into a features set defining a signature. In an embodiment, the server 108 may be configured to combine a Hough transform with a GIST or SURF recognition. Such implementation may also be accompanied by an existing image identifier system like Qualcom Vuforia, which is cited as a non-limiting example of implementation.

An additional embodiment may use a wavelet conversion of a normalized image in size, to extract a wavelet density map where relative local peaks of wavelet intensities are used as salient points, the relation between peaks are expressed for each peak in polar coordinates centered on the peak. The aim of this method is to create a tree of positions which then allows the features set to become member of a tree of salient point. At submission time, the same processing is applied and the exploration of the tree is done using highest peaks (more frequent local wavelet) with a search algorithm exploring tree branch. This creates a detector. This can be combined together as a multiplicity of weak detectors boosted together (e.g. using an ADA Boost Algorithm which is adapted to aggregate the score of all the weak detectors to create a unified strong score of detection involving the qualities of each score (e.g number of samples used for delivering each weak detector)) to enter a simplified classification method based on score of all other pages member of the database. The feature set expressed as a set of multiple polar coordinates is referred to as a signature.

Other image detection and sorting method can be used.

All these algorithms use image descriptors (features set) that are highly infective (many images can deliver the same feature set). Many different images may lead to the same descriptor and the descriptor does not even describe univocally a specific place of the image (document). This allows for matching the constraint required to encode the document in a non-copyrighted format.

The non-copyrighted format may have various aspects and even capabilities depending on the restrictions and requirements of copyright laws of different countries.

In one aspect, the non-copyrighted format may be considered as a readable document which is stored in a way that can only be decoded by the end users, as if the document belongs only to the end users. This belonging is established by the capabilities that the end users are given to display the document in front of a camera hence acting as a video feed of the document (as an alternative to taking JPEG picture of the document which can be easily sent and reproduced by other users who did not purchase a copy of the document). For example in France, the law allows a customer who legally owns a document to make a copy thereof only for their sole usage. In the present case, the embodiments allow the user to store the full image provided that no one else can access it, and thus, reasonable measures need to be taken to not induce the copyright infringement to prevent the user from sending a reproducible copy to other users, such that the copy belongs only to the user who owns it. An example of such measure is to analyze the video feed in search for natural jitter in order to guarantee that this is not a fake or compromised video feed.

However, a generally accepted inception of a non-copyrighted format is a format that does not allow to reconstruct the original information by any means. It must not be seen as an encryption but rather as a transformation so strongly infective that there is no way to find any rational representation of the document.

To exemplify this description, a popular MD5 digest of a document does not allow to reconstruct the document. When using the MD5 algorithm a simple change of a space in a document changes all the 16 numbers of the digest (According to the MD5 Specification, the digest of a digital data is a 16 digit number). So that by knowing the digest there is no way to reproduce the document hut only to deliver a Boolean certification than it is the proper one. In a same manner the knowledge of image descriptor and the dispersion of it over the document can only allow to analyze optical proximity but not to reconstruct it.

Not only does the descriptor (features set) exist in smaller cardinality (a newspaper page of 10,000 signs can be safely recognized with a digest made of 500 signs, therefore, the cardinality ratio is 20) than the document text but they also are of a kind where multiple characters give the same descriptor. For example, a descriptor may focus on the edge of a character made of the acute angle of top left of upper case. In the present scenario the character "R" will exhibit the same angle as the characters "E", "P", "D" "F", and "B" etc.

Also to mention, the set of descriptors is inserted within a Tree using for example a LSH (Locally Sensitive Hashing) algorithm. The LSH algorithm allows to create a tree for searching descriptors. A very simplified explanation about the LSH tree is that it involves fuzzy branches made of or original descriptors defining the branch, and the branch is made fuzzy by injecting a controlled randomized set of additional descriptors. In operation a sample is considered as belonging to a given branch (and thus the tree) if it falls within the fuzziness of the given branch.

These algorithms use a randomized control perturbation around every descriptor, and the tree aspect does change when inserting a new document. So that there is no way to see if a document had been stored by an analysis of the tree but can only allow to detect that an optically close document exists (if it has really been registered before).

These facts added to the fact that descriptor doesn't describe every characters creates potential permutations that make implausible the reconstruction of texts. It can be noted that it will be far easier to reconstruct the text by other means from the user's perspective, just for sake of exemplification a simple OCR ran by user and outside of the apparatus is easier to implement to reverse back to a document close to the original than expecting any result out of the descriptors tree.

In the case of a digital input like picture or a web page, it is possible that the media owners modify the content of the page e.g. a changing the text position, etc. with the intent to modify the salient points and thus the signature to prevent users from obtaining the comments of the actor. In the present case, it may be of interest to rasterise the display sections of interest separately for example text may be rasterised separately from the images or illustrative parts, with the intent to do individual block detection. The final classification process can then be asserted using a probability of presence of sufficient assets, this probability can be evaluated against all other existing combinations known for a publication. In other words, every media may have different tendencies and habits to edit the content of their pages, which allow to determine different level of probabilities of presence of sub elements to determine whether there is match or not.

Adding Comments

Referring back to the figures, the actor may add their comments 110 on the picture 102 as illustrated in FIG. 1b. For example, after taking the picture 102 the app may allow the actor to add comments on top of the picture. The comments 110 may be provided in boxes that the user may move around over the picture 102. For example, in FIG. 1b the actor has provided the comments "Not True" in two different boxes at the top and bottom of the picture 102.

As mentioned above, the purpose of the method is to virtual affix information received by the actor over a media shown by the fan on the device of the fan. The actor can associate various kinds of comments using an image editor online or embedded in the application. The image editor allows providing the comments in designated areas. This information can be very elaborate and can take the form of a video clip, an audio comments, a cartoon or a simply a text. It can also involve a hyperlink to a web site where additional social activities may occur. This information is called meta information hereafter and various solutions exist to edit it within a layer over an image. Some editor of that kind can be written in javascript and can be a complement process or be natively integrated to the appSuch materials are intended to appear on a display of a fan when the fan scans the offending page, as will be described in further detail hereinbelow. n operation, the digest 106 and the comments 110 are sent to the server 108 for storage. In an embodiment, location information concerning the size and location of the boxes containing the comments 110 are also sent so that the fans can view the comments in the same way that the actor has intended.

A verification/identification mechanism may be provided which identifies the actor or their public relation (PR) office to allow them to register such comments 110 on the server 108 for further viewing by the public.

The actor may also act as a moderator if they would like to. Moderation activities allow the actor to receive comments from fans and publish them or not on the main overlay display, or through a Blog system. For example, the fan can have access to the same editor of meta information on overlay, individually or by group as the case maybe as the VIP organizes the interaction. The actor may also elect other people to take this role.

At the Fan's Side

The public can be explicitly informed of the existence of offending materials, mentioning the name of a publications is not considered as copyright infringement and the actor is even able to not mention it but just allow fan to try on. Fans can detect the presence or absence of comments by the actor in response to offending materials published in the media using a portable device which is configured to contact the image server 108.

A designated app may be provided for download by the fans. The version of the app that is to be installed on the fan's portable devices includes similar functionalities to the app that is intended for the actor. For example, aspects of the app which deal with image pick up, processing, qualification, and guidance to take a different picture are substantially the same. The main difference is that the app of the fans is intended to receive the comments and overlay them over the picture taken, while the actor's app is intended to provide the comments in designated areas over the picture taken and send them to the server 108 for storage.

Figure 1C:
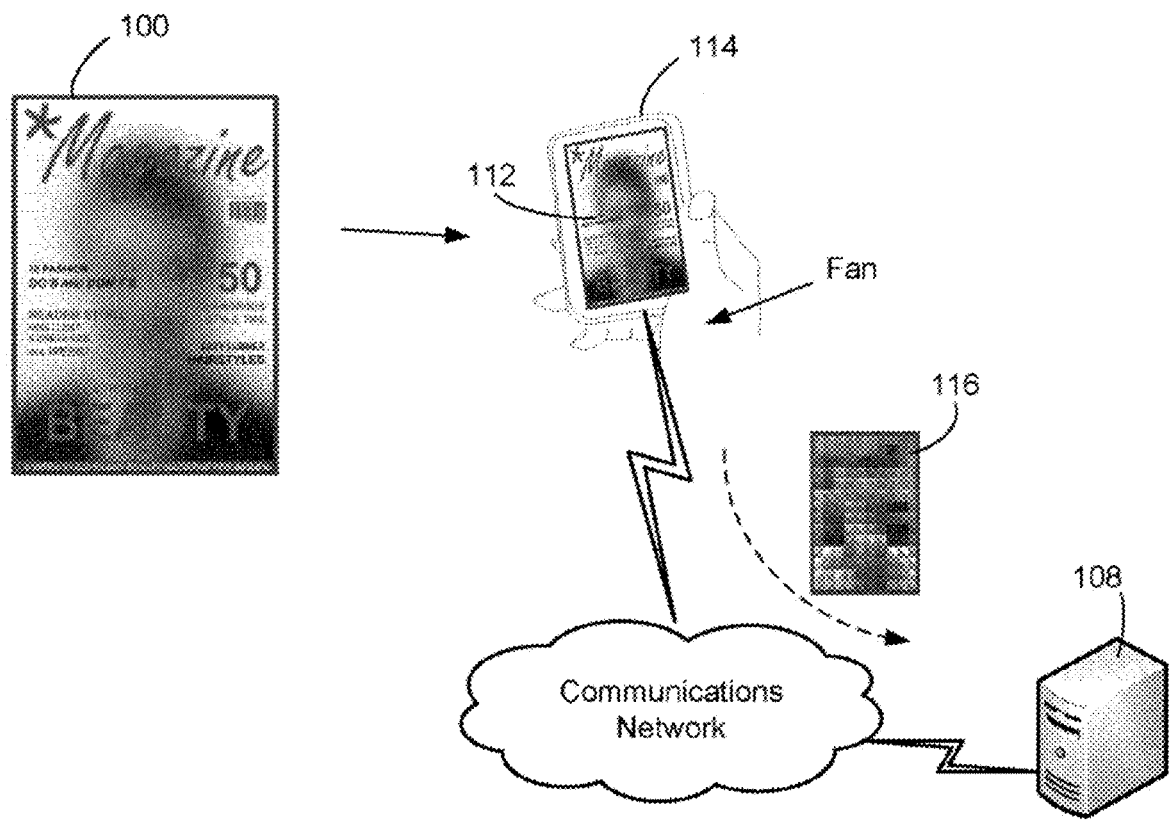
FIG. 1c illustrates an example of how the fan can take a picture of the published materials and check for the presence of comments by the actor mentioned in the published materials, in accordance with an embodiment.

FIG. 1c illustrates an example of how the fan can take a picture of the published materials and check for the presence of comments by the actor mentioned in the published materials, in accordance with an embodiment. As shown in FIG. 1c, when the fan sees offending materials about the actor on a magazine 100 (or on a website or in a social media app), the fan may take a picture 112 of the offending materials using a dedicated app installed on a portable device 114. The app would perform the same analysis discussed above on the picture 112 to extract a digest 116 of the picture 112 and sends the digest 116 to the server 108 for verification. Upon receiving a digest 116 from the fan, the server 108 may perform the exact analysis performed when receiving the digest 106 from the fan. That is to extract the salient points that represent the signature of picture 112.

Figure 1D:
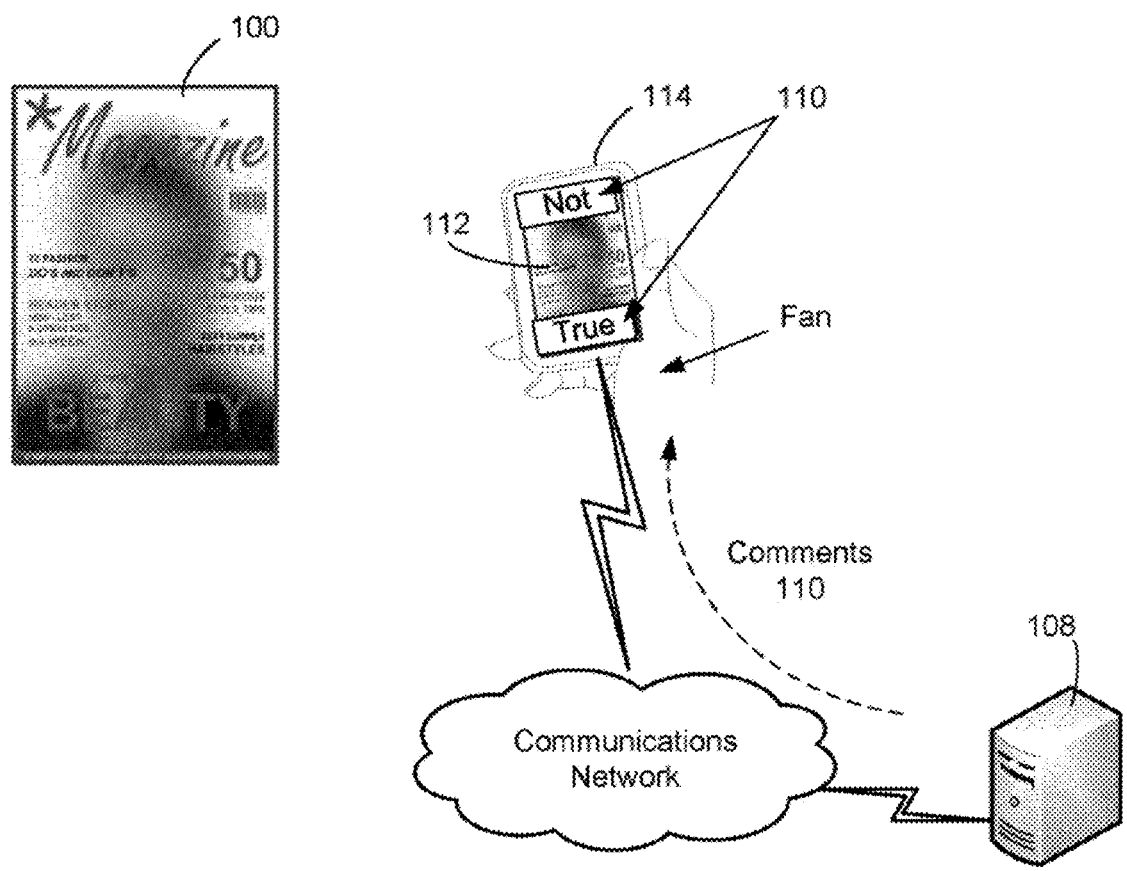
FIG. 1d illustrates an example of how the fan can receive and view the comments provided by the actor in response to the offending materials shown in FIG. 1c.

Subsequently, the server 108 may compare the signature of the digest 112 with existing signatures. FIG. 1d illustrates an example of how the fan can receive and view the comments provided by the actor in response to the offending materials shown in FIG. 1c. As shown in FIG. 1d, if the similarity factor between the signature of the received digest 116 and an existing signature is above a given threshold (e.g. enough feature points with a good similarity and coincidence), the server 108 may fetch the appropriate additional comments 110 and transmit them to the app for displaying the comments 110 over the picture 112 taken by the fan. Whereby, the picture representing the offending material is used as a background and the comments 110 received from the server 108 are overlaid on top of the offending material. Thereby, providing comments on offending materials published in the media without storing the offending materials on the server. Subsequently avoiding copyright infringement of the published materials.

In the case where the app send the signature and not the digest, the server may simply compare the signature with pre-registered signatures and will forward the comments associated with a given signature when the comparison factor between the received signature and the given signature is above a certain threshold.

Various modifications may be performed to the embodiments presented therein which fall within the scope of this disclosure and the claims appended thereto. For example, as discussed above, the comments may take the form or text, graphics, picture, video, audio or the like.

In another example, the offending materials captured by the actor or fan may also take the form of a video. For example, a fabricated video clip may be displayed on a webpage showing the actor in a red Ferrari exiting their house, and later on showing a similar red Ferrari (which is not for the actor) involved in a hit and run accident. In the present case, the actor may provide comments showing that the license plate of his car is different than the license plate of the car involved in the hit and run accident. Such comments may take the form of one or more pictures that show the license plate of his car and then the license plate of the other car. The comments may also be in the form of a video that plays on top of the offending video etc.

The comments may be overlaid on the screen of the computing device as long as the camera of the computing device is capturing the page that represents the offending material. In another embodiment, the comments may be sent to overlay the picture 112 of the offending material without requiring the user to maintain the camera over the magazine.

Both embodiments also apply when the offending materials are in a webpage or picture or app shown on the computing device (camera is not used).

Positions of the salient points are considered from the server and a decent perspective matrix is constructed in the server to help the tracking mechanism within the Fan display system.

The image tracking mechanism is then launched to make the overlaid information/comments follow the movement of the user's camera will may jitter or even move over the media. It is initially fed with the perspective matrix that will be updated in real time if the Fan display system is of an image stream nature.

It can be noted that the apparatus does not need a perfect authentication of the media as the purpose is to find an article about the actor. An optically or semantically identical content justifies the same reaction. However the degree of similarity (threshold) can be tuned by the actor to allow for some flexibility within a reasonable context (no pollution of some other content).

In an embodiment, the actor may simply make a statement on their own web page or social media page that an opinion has been available in response to wrongful allegations, without promoting or specifying the offending source. Many methods can be used like Twitter® or Facebook®, personal webpages, blogs, etc.

It is then expected than the Fans will search for the offending pages and will obtain the actor's comments using the embodiments described herein.

In another embodiment, it is possible to allow the fans to refer offending materials to the actor with an indication of the sources. The fan may send links or emails about the offending materials to a general email or may post them in a blog or send them via the app. The actor may then view the received materials and decide whether to respond or not. The report of joint information about publication also allows for determining certain probabilities of the sources. In other words, the more people refer the same offending material the more credible the source of the material becomes and the necessity to provide comments thereto would also increase.

A dialog in form of message may be exchanged to inform the actor of the sources where the information has been published. The server 108 may then gather information such as geo-localisation, IP address, Phone number, login, etc. . . .

Additionally a statistical analysis may be done across various actors to allow for determining a global suspicion of sources of offending materials.

It should be noted that the embodiments maybe implemented for a single actor (e.g. preferred actor) and may also combine comments provided by different actors. Thereby, by taking a snapshot of a first page of a magazine which mentions actor A the user may receive comments by actor A (or even by a different actor), and by scanning another page which mentions actor B, the fan may receive comments by actor B. Whereby the server 108 may provide the fan interaction service to different actors (or famous entities).

Figure 2:
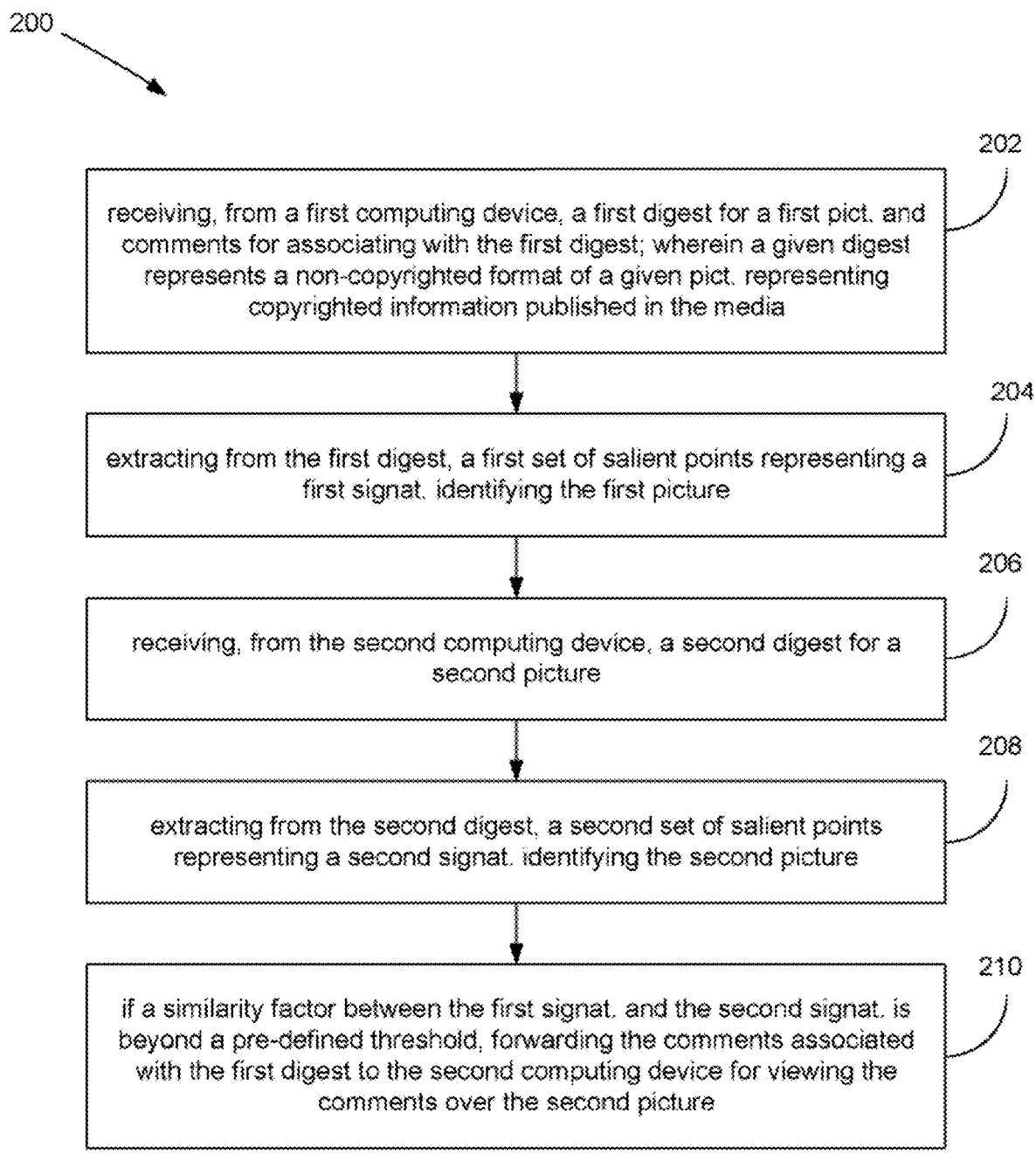
FIG. 2 is a flowchart of a method for interfacing with information posted in the media, in accordance with an embodiment.

FIG. 2 is a flowchart of a method for interfacing with information posted in the media, in accordance with an embodiment. The method 200 begins at step 202 by receiving, from a first computing device, a first digest for a first picture and comments for associating with the first digest; wherein a given digest represents a non-copyrighted format of a given picture representing copyrighted information published in the media. Step 204 comprises extracting from the first digest, a first set of salient points representing a first signature identifying the first picture. Step 206 comprises receiving, from the second computing device, a second digest for a second picture. Step 208 comprises extracting from the second digest, a second set of salient points representing a second signature identifying the second picture. Step 210 comprises forwarding the comments associated with the first digest to the second computing device for viewing the comments over the second picture if a similarity factor between the first signature and the second signature is beyond a pre-defined threshold.

Hardware and Computing Environment

Figure 3:
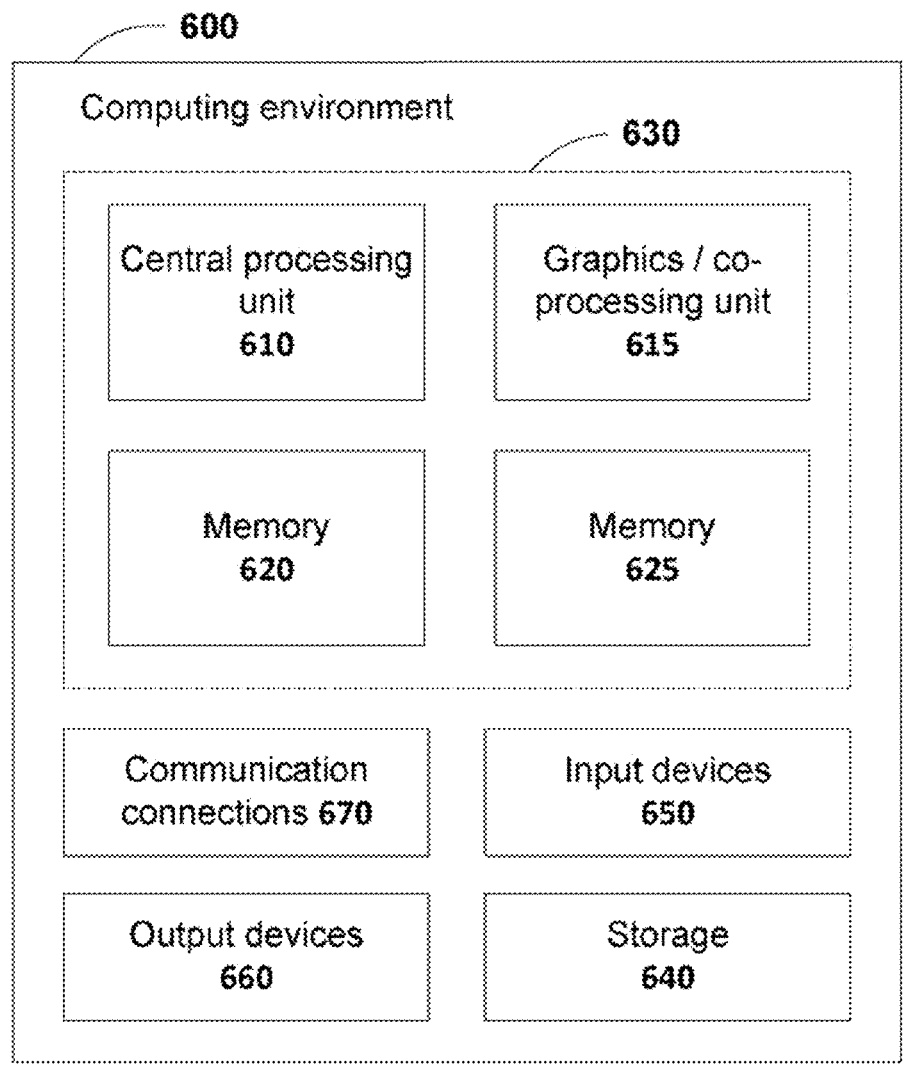
FIG. 3 illustrates a generalized example of a suitable computing environment in which the described embodiments may be implemented.

Embodiments of the system and method described herein can be implemented in a computing environment. FIG. 3 illustrates a generalized example of a suitable computing environment 800 in which the described embodiments may be implemented. The computing environment 600) is not intended to suggest any limitation as to scope of use or functionality, as the techniques and tools may be implemented in diverse general-purpose or special-purpose computing environments.

In one aspect, the computing environment 600 may take the form of a portable device such as a smartphone or tablet equipped with an imaging device for capturing information posted in the media, and capable of transmitting and receiving data over a telecommunications network. In another aspect, the computing environment 600 may take the form of a server or farm of servers or computing devices which are also configured to transmit and receive data over a telecommunications network for receiving comments from VIP and sending those comments for viewing on portable devices of users.

With reference to FIG. 3, the computing environment 600 includes at least one CPU 610 and associated memory 620 as well as at least one GPU or other co-processing unit 615 and associated memory 625 (used for example for video acceleration). In FIG. 3, this most basic configuration 630 is included within a dashed line. The processing unit 610 executes computer-executable instructions and may be a real or a virtual processor. In a multi-processing system, multiple processing units execute computer-executable instructions to increase processing power. A host encoder or decoder process offloads certain computationally intensive operations to the GPU 615. The memory 620,125 may be volatile memory (e.g., registers, cache, RAM), non-volatile memory (e.g., ROM, EEPROM, flash memory, etc.), or some combination of the two. The memory (620, 625) stores software 680 for a decoder implementing one or more of the decoder innovations described herein.

A computing environment may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, DVDs, or any other medium which can be used to store information and which can be accessed within the computing environment 600. The storage 640 stores instructions for the software 680.

The input device(s) 650 may be a touch input device such as a keyboard, mouse, pen, or trackball, a voice input device, a scanning device, or another device that provides input to the computing environment 600. For audio or video encoding, the input device(s) 650 may be a sound card, video card, TV tuner card, or similar device that accepts audio or video input in analog or digital form, or a CD-ROM or CD-RW that reads audio or video samples into the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can, be accessed within a computing environment. By way of example, and not limitation, with the computing environment 600, computer readable media include memory 620, storage 640, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description may use terms like "decide," "make" and "get" to describe computer operations in a computing environment. These terms are high-level abstractions for operations performed by a computer, and should not be confused with acts performed by a human being. The actual computer operations corresponding to these terms vary depending on implementation.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A memory device having recorded thereon a non-transitory computer-readable program for execution by a processor of a computing device for causing the computing device to:
    take a picture of a copyrighted-material published in the media, and display the picture on a display device associated with the computing device;
    transform the picture into a set of salient points defining a signature representing a non-copyrighted format of the picture, the signature being configured to enable identification of the picture in a database when compared with another signature of another picture of the same copyrighted material;
    send the signature to a remote server for comparison with a set of pre-stored signatures, each pre-stored signature having associated therewith a set of comments and location information specifying a location in which the set of comments are to be displayed on a given picture;
    if a match exists between the signature and one of the pre-stored signatures, receive from the remote server the set of comments associated with the one pre-stored signature and the associated location information; and
    display the set of comments associated with the one pre-stored signature over the picture displayed on the display device of the computing device at the location specified by the associated location information.

2. The memory of claim 1, wherein the comments take the form of one or more of: text, graphics, picture, and video.

3. The memory of claim 1, wherein the program causes the computing device to receive and display instructions from the remote server to take a new picture.

4. The memory of claim 1, wherein the program is configured to display the comments as long as an imaging device associated with the computing device is capturing the copyrighted media.

5. The memory of claim 1, wherein the program is configured to display the comments after the imaging device ceases to capture the copyrighted media.

6. The memory of claim 1, wherein the program is configured to display the comments until the imaging device captures new copyrighted media for which other comments are available at the server.

7. The memory of claim 1, wherein the picture is taken using an imaging device.

8. The memory of claim 1, wherein the picture is a screenshot taken in a digital format from a web-page or an app.

9. The memory of claim 1, wherein the picture represents one or more frames of a video stream.

10. A computing device comprising:
    a processor;
    a memory;
    an imaging device;
    wherein the computing device is configured to:
    take a picture of a copyrighted material, and display the picture on a display device associated with the computing device;
    transform the picture into a non-copyrighted format, the non-copyrighted format being configured to enable identification of the picture in a database when compared with another non-copyrighted format of another picture of the same copyrighted material;
    send the non-copyrighted format to a remote server for comparison with a set of pre-stored signatures, each pre-stored signature having associated therewith a set of comments and location information specifying a location in which the set of comments are to be displayed on a given picture;

if a match exists between the non-copyrighted format and one of the pre-stored signatures, receive from the remote server the set of comments associated with the one pre-stored signature and the associated location information; and display the set of comments associated with the one pre-stored signature over the picture displayed on the display device of the computing device at the location specified by the associated location information.

11. The computing device of claim 10, the computing device being further configured to perform a Hough transform on the taken image, prior to extracting salient points, for determining a degree of distortion, and a loci for correction, wherein performing barrel distortion comprises applying an image warping method.

12. The computing device of claim 10, the computing device being further configured to apply a Hue, Saturation, and Intensity Value histogram on the taken image, prior to extracting salient points, for determining an amount of luminosity damage caused to the over-exposed areas and prompting a user to take a new image.

* * * * *